United States Patent [19]

Allen et al.

[11] Patent Number: 4,879,958
[45] Date of Patent: Nov. 14, 1989

[54] FLUIDIZED BED REACTOR WITH TWO ZONE COMBUSTION

[76] Inventors: John V. Allen, 1554 Matthews, Vancouver V6J 2S9; Berend Put, 4660 Pheasant Place, North Vancouver V7R 4C3; Geoff W. Boraston, 1104 - 1265 Burnaby Street, Vancouver V6E 1P8, all of Canada

[21] Appl. No.: 286,134

[22] Filed: Dec. 19, 1988

[51] Int. Cl.$^4$ .......................... F23G 5/00; F23G 7/00
[52] U.S. Cl. .................................. 110/245; 34/57 A; 122/4 D; 165/104.16; 422/143
[58] Field of Search ............... 110/245, 263, 347, 346; 34/57 A; 431/7, 170; 422/143; 432/58; 165/104.16; 122/4 D

[56] References Cited

U.S. PATENT DOCUMENTS

| | | | |
|---|---|---|---|
| 4,096,640 | 6/1978 | Krambrock et al. | 34/52 A X |
| 4,211,186 | 7/1980 | Pearce | 110/245 X |
| 4,249,472 | 2/1981 | Mitchell | 110/245 |
| 4,817,563 | 4/1989 | Beisswenger et al. | 110/245 X |

Primary Examiner—Edward G. Favors
Attorney, Agent, or Firm—Fetherstonhaugh & Co.

[57] ABSTRACT

In a fluidized bed thermal reactor including a main housing including, a waste inlet, an exhaust gas outlet, an incombustible solids outlets, a base member, a fluidizable medium located on the base member, a plurality of gas inlets in the base member whereby a fluidizing medium located on the base member may be fluidized, and the improvement comprising a hollow body of generally triangular cross-section extending across the main housing and dividing the housing into upper and lower zones and having a pair of arcuate deflector surfaces. A gas inlet into the body is provided whereby gas may be fed to the interior of the body. A plurality of openings are provided in the top of the body whereby gas fed to the body through the gas inlets heated in the body may rise upwardly in the upper zone to assist in combustion in that upper zone.

9 Claims, 1 Drawing Sheet

FLUIDIZED BED REACTOR WITH TWO ZONE COMBUSTION

FIELD OF THE INVENTION

This invention relates to a fluidized bed, thermal reactor.

DESCRIPTION OF THE PRIOR ART

The combustion of waste is of some considerable antiquity. Originally open hearth type furnaces, similar to those used in large boilers, were used for waste incineration. However, these proved inefficient in the combustion of solids. Raked hearths and moving grate devices were developed to provide better combustion and, in particular, high temperatures. However, these moving grate devices developed into very large and cumbersome incinerators that require a high degree of maintenance of the hearth moving grates and require large amounts of combustion air and long residence time to produce only relatively low combustion efficiencies.

A major development was the use of fluidized beds to provide better contact between the waste and combustion gases and to avoid having mechanical moving parts within the incinerator. The material of the bed acts as a high temperature heat exchange medium. However, simple fluidized beds suffer from an inability to ensure a uniform furnace temperature, to move non-combustibles out of the bed and to evenly distribute the fuel throughout the bed.

A fluidized bed is created by blowing a gas, frequently air, through a solid so that the solid moves or flows with the air in the manner of a fluid. Typically in incineration an inert solid, for example sand, is used as a fluidized bed heat exchange medium.

With the given disadvantages of the use of simple fluidized beds in incineration combustion the next step was the development of revolving fluidized beds in which combustion efficiency was greatly improved by providing vigorous cross and vertical mixing of the waste and combustion gases. An early patent in this field is British Patent No. 1,299,125 granted to Power Gas. In that patent a non-uniform fluidized bed is used. By introducing a mixture of combustible and non-combustible refuse onto the surface of the bed, good combustion is achieved.

A further development was in British Patent No. 1,577,717 where a thermal reactor was divided into an inner and an outer concentric compartments with a conical baffle positioned above the inner compartment.

However, there were disadvantages in this process and such disadvantages are outlined in U.S. Pat. No. 4,419,330 issued Dec. 6, 1983 to Ishihara et al. as including:

Large sized objects may clog the gap between the lower end of the inner compartment and the base of the furnace. Because of the use of two compartments the descending rate of the moving bed portion is small and the amount of circulating fluidized medium is limited, which in turn limits the capacity for incineration. The range in which the descending rate of the moving bed can be controlled is small and the gas generated during the descent is prevented from being delivered to the combustion zone, that is the fluidized bed, so that the gases merely burn within the apparatus, without being used to heat the medium. Furthermore, the use of concentric compartments means that repair and maintenance of the device, particularly of the inner compartment, can be difficult.

Ishihara et al. claimed to have solved these problems in providing a fluidized bed thermal reactor that featured deflecting means on each opposed inner side wall of the reactor. Then deflecting means extend inwardly towards each other to provide a wasting effect in the reactor. By this means gas flow within the reactor was improved.

Although the equipment as exemplified by Ishihara et al. has provided extremely good results there are a number of disadvantages. In particular, the arrangement of deflectors on the interior of exterior walls means that the gas must flow up the outside walls, be deflected inwardly by the projections and then downwardly in the middle. In this regard it should be emphasized that there are twin fluidized beds, operating in parallel. This flow pattern is contrary to the natural flow in a fluidized bed which is upwardly at the centre, outwardly and then downwardly at the outer surface of the furnace. Furthermore, the inwardly projecting walls in the Ishihara et al. proposal means relative complexity of structure and consequent expense. Also, the equipment of Ishihara et al does not provide an ideal fuel feed location. With large thermal reactors, the fuel must be dropped from above onto the sinking portion of the bed. this can result in some suspension burning.

Our copending patent application having internal reference U.S. Ser. No. 286,133, filed Dec. 19, 1988, and entitled Fluidized Bed Reactor teaches a simplified structure for a fluidized bed reactor.

SUMMARY OF THE INVENTION

The present invention seeks to provide a sophisticated version of the reactor of the above copending application in providing in particular a furnace that is divided into two combustion zones, combustion taking place at relatively low temperature, typically at about 400° to 900° C., in the lower zone and unburned volatile being combusted at much higher temperatures, for example in the range 1600° to 1800° C. in the upper zone. This invention allows the fuel to be introduced into the sinking portion of the bed along the full length of the reactor without dropping the waste from above.

Accordingly the present invention provides a fluidized bed thermal reactor comprising:
 a main housing including:
 a waste inlet;
 an exhaust gas outlet;
 an incombustible solids outlets; a base member;
 a fluidizable medium located on the base member;
 a plurality of gas inlets in the base member whereby a fluidizing medium located on the base member may be fluidized;
 the improvement comprising a hollow body of generally triangular cross-section extending across the main housing and dividing the housing into upper and lower zones and having a pair of arcuate deflector surfaces;
 a gas inlet into the body whereby gas may be fed to the interior of the body;
 a plurality of openings in the top of the body whereby gas fed to the body through the gas inlets heated in the body may rise upwardly in the upper zone to assist in combustion in that upper zone.

DESCRIPTION OF THE DRAWINGS

Aspects of the invention are illustrated, merely by way of example, in the accompanying drawings in which.

DESCRIPTION OF THE PREFERRED EMBODIMENTS

Figure 1:
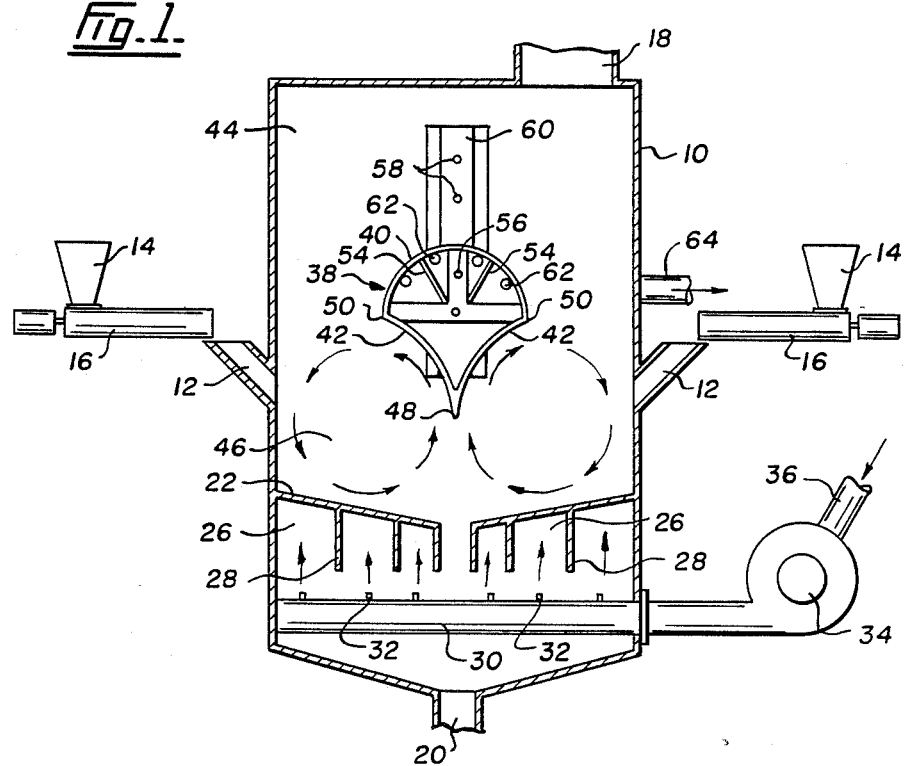
FIG. 1 is a side elevation of a reactor according to the present invention.

FIG. 1 shows a fluidized bed thermal reactor comprising a main housing 10 including a pair of waste inlets 12 and means to provide waste to those inlets in the form of hoppers 14 and conveyers 16. There is an exhaust gas outlet 18 at the top and an outlet 20, in the bottom, so that uncombusted solids may be removed from the reactor. The reactor has a base member 22 and a fluidized medium, not shown for convenience but comprising sand or the like chemically inert, refractory material, is located on the base 22. A plurality of gas inlets or openings 24 are formed in the base member. There are compartments 26 formed by walls 28 beneath the base 22 to permit variation in the flow of gas, usually air, to differing areas of the base 22. This arrangement, which is known from the prior art, provides some control of the direction and vigour of fluidization of the bed. There is an air inlet pipe 30, with jets 32, and a pump 34 so that air may be pumped into the reactor. The pump has an inlet 36.

Figure 2:
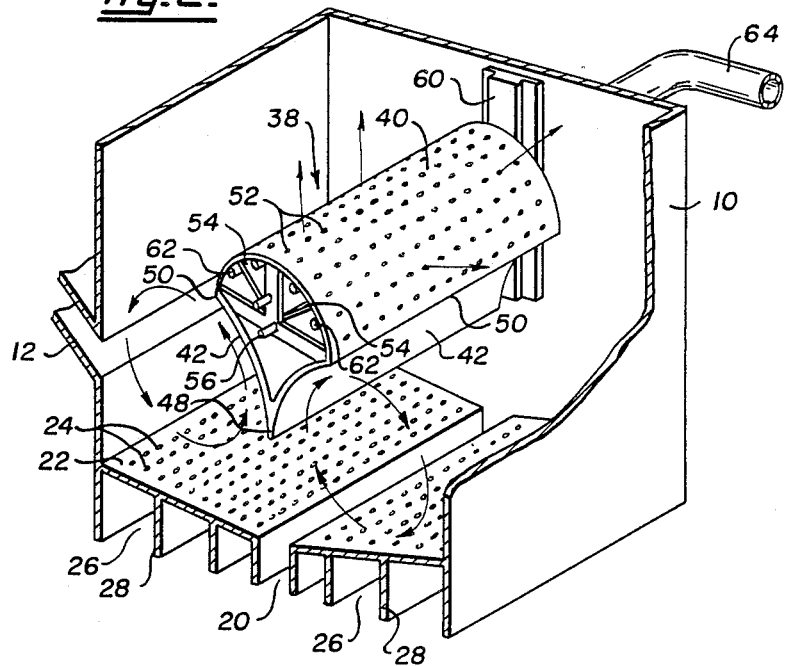
FIG. 2 is a schematic view illustrating the mode of operation of the furnace of FIG. 1.

According to the present invention there is a hollow body 38 having a top 40 and sides 42 extending across the main housing 10 and dividing the housing 10 into an upper combustion zone 44 and a lower combustion zone 46. The sides 42 of body 38 act as deflector surfaces. Their arcuate surfaces deflect the rising gas outwardly causing the refractory material and fuel to circulate in the manner indicated by the circles of arrows in both FIGS. 1 and 2. The circulating refractory material and fuel form a pair of fluidized beds, each revolving side by side. The direction of flow is particularly important. By selecting the gas flow through the base 22 and positioning the deflector surfaces 42 as shown the desired flow direction of refractory material and fuel can be achieved, that is upwardly at the center, outwardly and downwardly at the outer edge. These deflector surfaces are joined at a lower most point 48 and then curve upwardly to their outermost edges 50. The top 40 is curved upwardly to its center and is provided with plurality of openings 52. There is a gas inlet into the body 54 comprising a simple pipe extending into the interior of the body 38 whereby a gas may be fed to the interior of the body 38. The gas leaves the body through the openings 52, after being heated in the body and rises upwardly to assist in combustion in the upper compartment.

The hollow body 38 is provided with internal walls 54 that divide the body 38 to ensure distribution of air across the complete upper surface 40.

There are means to raise and lower the body 38 in the housing 10. In this regard the body is suspended in the body by the provision of projections 56 engaging recesses 58 located in tracks 60 to receive the projections 56. Unused recesses 58 for any one position of the body 38 may be sealed in a gas tight manner. This ability to raise and lower the body 38 is important as it can determine the relative sizes of the upper and lower zones 44 and 46 for any particular material being combusted.

There are fluid carrying heat exchange pipes in the body 38. Pipes 62 are arranged to carry liquid so that excess heat may be removed from the body and used, for example, for central heating or the like. Similarly, an air pipe 64 may be used so that air can be passed from the body 38 to the pump 34, which provides air to fluidize the bed. In this way the bed is fluidized with preheated air, thus greatly assisting in the thermal efficiency of the reactor.

Similarly the exhaust gases, passing through the outlet 18 can also be used as a source of heat.

The apparatus according to the present invention is used in a conventional manner. The fuel that is used, at least for most of the operation, is waste material, fed through inlets 12. However, the heating process is started by using a fuel such as oil or gas to combust in the reactor. Fluidizing gas, usually air, is forced through the openings 24 by pump to fluidize the bed. The refuse is then brought into contact with the heated, fluidized bed, including the combusting fuel. Once combustion of the refuse is started the process is self-sustaining. The oil or gas is switched off and the refuse maintains its own combustion.

Conventional combustion, conventional that is for fluidized beds, takes place in the lower zone 46 where the temperature would typically be in the range 400° to 900° C. In this way sub-stoichiometric burning takes place, as is conventional. However, the heat and combustion products also pass by the body 38 and mingle with heated gases, including unused oxygen, that is passed through the openings 52 in the body 38. By this means combustion in the upper zone 44 can destroy unburned volatiles at high temperature, not available in the lower zone 46. The temperature in the upper zone 44 typically in the range of 1600° to 1800° C.

Ash is removed through the outlets 20 and absorbed gases leave the furnace through outlet 18. As in the prior art the furnace can be used to generate electricity and can be used as a source of heat. In addition, it is an extremely efficient means of rendering waste, including municipal and industrial waste into sterile innocuous solids of extremely small volume compared with the volume of garbage or refuse fed to the reactor.

The embodiments of the invention in which an exclusive property or privilege is claimed are defined as follows:

1. In a fluidized bed thermal reactor comprising:
   a main housing including:
   a waste inlet;
   an exhaust gas outlet;
   an incombustible solids outlets; a base member;
   a fluidizable medium located on the base member;
   a plurality of gas inlets in the base member whereby a fluidizing medium located on the base member may be fluidized;
   the improvement comprising a hollow body of generally triangular cross-section extending across the main housing and dividing the housing into upper and lower zones and having a pair of arcuate deflector surfaces;
   a gas inlet into the body whereby gas may be fed to the interior of the body;
   a plurality of openings in the top of the body whereby gas fed to the body through the gas inlets heated in the body may rise upwardly in the upper zone to assist in combustion in that upper zone.

2. A reactor as claimed in claim 1 in which the upper surfaces curve upwardly to its center.

3. A reactor as claimed in claim 1 including means to raise and lower the body in the housing.

4. A reactor as claimed in claim 1 including fluid carrying heat exchange pipes within the body.

5. A reactor as claimed in claim 4 in which at least some of the fluid carrying pipes carry liquid.

6. A reactor as claimed in claim 4 in which at least some of the pipes carry air;
a pipe connecting the air carrying pipes to a pump, a conduit connecting the pump to the plurality of gas inlets in the base member whereby fluidizing of fluidizing medium is carried out with a pre-heated gas.

7. A reactor as claimed in claim 1 comprising inner walls within the body to divide the walls into compartments to ensure distribution of the air to all parts of the upper surface of the body.

8. A reactor as claimed in claim 1 in which the walls are made of ceramic tubing through which air is carried for preheating.

9. A reactor as claimed in claim 8 which has holes between the ceramic tubing through which preheated combustion air is blown.

* * * * *